United States Patent
Nellen et al.

(10) Patent No.: US 6,631,944 B1
(45) Date of Patent: Oct. 14, 2003

(54) OPEN ROOF CONSTRUCTION FOR A VEHICLE

(75) Inventors: Marcel Johan Christiaan Nellen, Venray (NL); Wouter Petrus Kaandorp, Roermond (NL)

(73) Assignee: Inalfa Roof Systems Group BV (NL)

( * ) Notice: Subject to any disclaimer, the term of this patent is extended or adjusted under 35 U.S.C. 154(b) by 0 days.

(21) Appl. No.: 09/913,009

(22) PCT Filed: Feb. 3, 2000

(86) PCT No.: PCT/NL00/00070

§ 371 (c)(1), (2), (4) Date: Jan. 11, 2002

(87) PCT Pub. No.: WO00/47435

PCT Pub. Date: Aug. 17, 2000

(30) Foreign Application Priority Data

Feb. 9, 1999 (NL) .............................................. 1011251

(51) Int. Cl.$^7$ ................................................ B60J 7/043
(52) U.S. Cl. ............................ 296/216.03; 296/216.05; 296/223
(58) Field of Search ........................... 296/216.01, 222, 296/216.02, 216.03, 216.04, 216.05, 223

(56) References Cited

U.S. PATENT DOCUMENTS

| 4,678,228 A | * | 7/1987 | Boots ..................... 296/216.03 |
| 4,730,868 A | * | 3/1988 | Niwa ..................... 296/216.03 |
| 5,238,290 A | | 8/1993 | Farmont ..................... 296/216 |
| 5,288,125 A | | 2/1994 | Huyer ..................... 296/216 |
| 5,618,081 A | | 4/1997 | Nabuurs ..................... 296/216 |
| 5,765,907 A | | 6/1998 | Nabuurs ..................... 296/216 |
| 6,419,309 B1 | * | 7/2002 | Kaandorp et al. ..... 296/216.03 |

FOREIGN PATENT DOCUMENTS

| DE | 41 01 288 A1 | | 7/1991 |
| EP | 0 543 427 A1 | | 9/1992 |
| EP | 0 638 452 A1 | | 2/1995 |
| EP | 1052126 A1 | * | 11/2000 |

* cited by examiner

Primary Examiner—D. Glenn Dayoan
Assistant Examiner—Jason Morrow
(74) Attorney, Agent, or Firm—Westman, Champlin & Kelly, P.A.; S. Koehler

(57) ABSTRACT

An open roof construction for a vehicle having an opening in its fixed roof comprises a stationary part to be fixed to the roof, which stationary part includes a guide rail present on at least one side of the roof opening. A panel supported by the stationary part is adjustable between a closed position, in which it closes the roof opening, and an open position, in which it has been moved to a position above the fixed roof. This is effected by an operating mechanism present between the panel and the guide rail, which operating mechanism includes a supporting part which supports the panel and a first slide which is capable of sliding movement along the guide rail. The supporting part of the operating mechanism slidably supports the panel, while a second slide is provided, which is capable of moving the panel with respect to the supporting part by a connecting part. Preferably, the panel and the supporting part are guided with respect to each other by a roller guide.

15 Claims, 4 Drawing Sheets

OPEN ROOF CONSTRUCTION FOR A VEHICLE

CROSS-REFERENCED TO RELATED APPLICATION

This application is a Section 371 National Stage application of International Application No. PCT/NL00/00070 filed on Feb. 3, 2000 for "OPEN ROOF CONSTRUCTION FOR A VEHICLE", which was published in English, which claims priority of Netherlands patent application 1011251, filed Feb. 9, 1999.

BACKGROUND OF THE INVENTION

The invention relates to an open roof construction having an adjustable panel for opening and closing a roof opening in a vehicle.

Open roof constructions of this kind (commonly called spoiler roofs) are known in various embodiments thereof. In most embodiments, the pivoting and sliding movements take place separately, in succession, that is, the panel is first pivoted to a ventilating position, so that it can subsequently be slid rearwards to a maximally open position. The movements are thereby initiated by means of a crank or a motor driving unit, and transmitted to the panel by an operating mechanism.

In the case of a spoiler roof, the object is usually to enable a relatively large pivoting angle in the ventilating position of the panel, so as to obtain a sufficiently large ventilating opening, while in the rearwardly moved positions of the panel it is on the contrary advantageous to obtain the smallest possible pivoting angle so as to minimize the air resistance and the forces that are exerted on the panel. When the panel movement takes place as described above, these requirements are difficult to combine. Although spoiler roofs are known wherein rearward movement of the panel is accompanied by a movement in downward direction, this requires a complicated operating mechanism.

GB-A-2 164 006 discloses a manually operated spoiler roof, wherein the pivoting mechanism is arranged for obtaining two stable pivoted positions of the panel, a high ventilating position and a low position, in which the panel can be slid rearwards.

FR-A-2 648 403 discloses a spoiler roof operated by driving means, wherein a driving slide can be moved forwards and rearwards from a closed position so as to pivot the panel to a tilted position and move the panel rearwards in a low position above the fixed roof, respectively.

SUMMARY OF THE INVENTION

The object of the present invention is to further improve an open roof construction of the kind referred to in the introduction. In this manner, an open roof construction for a vehicle having an opening in its fixed roof, can include a stationary part to be fixed to the roof, which stationary part includes a guide rail present on at least one side of the roof opening. At least one adjustable panel is supported by said stationary part, which is adjustable between a closed position, in which it closes the roof opening, and an open position, in which it has been moved to a position above the fixed roof. An operating mechanism arranged between the panel and the guide rails displaces the panel and includes a supporting part, which supports said panel, and a first slide which is capable of sliding movement along said guide rail, and a second slide, which is capable of slidably moving the panel with respect to said supporting part by a connecting part.

In this way, an adjustment range in a rearward direction of the first slide from the closed position will suffice, after which the second slide takes care of the movement in the rearward direction of the panel. In this case it is also possible to have the supporting part of the panel supported as far to the rear as possible by the first slide, so as to enhance the stability without this standing in the way of achieving a high opening percentage of the roof opening. On the contrary, the construction or assembly according to the invention makes it possible to release a large part of the roof opening, whereby the opening percentage can be increased even further by using a telescopic intermediate part between the supporting part and the panel.

In the case that the first slide can be moved both forwards and rearwards from a position corresponding to-the closed position of the panel, in order to pivot the panel upwards, a further advantage of supporting the panel at a rear location is that it is possible to select a relatively long adjustment range in a forward direction of the first slide, as a result of which the motor load or driving force needed to displace the panel will remain low, which is advantageous, of course. Furthermore, the forward movement of the slide for the purpose of pivoting the panel upwards to a ventilating position ensures that the wedging action of the slide with respect to a first pivot point of the panel causes the panel to pivot upwards already, so that a large pivoting movement of the panel can be achieved while using a relatively flat operating mechanism.

In this embodiment, it is advantageous if a driving device, such as pull-push cable guided in the guide rails, and the first and the second slide are fitted with cooperating couplers for selectively coupling and uncoupling the driving device to and from said first and said second slide, wherein preferably the guide rails are fitted with control elements for said couplers.

A very advantageous embodiment is one wherein a guide in the form of a roller guide, preferably comprising a telescopic intermediate part, is mounted between the panel and the supporting part. Said roller guide, which is for example comparable with a guide of a drawer, has a number of advantages. In the first place, friction will be reduced by the rolling movement of the panel, while furthermore the extent to which said friction varies will be reduced. As a result, the required driving force or motor power is reduced, the reliability of a possible anti-jamming provision will be enhanced and the amount of wear will be reduced.

BRIEF DESCRIPTION OF THE DRAWINGS

The invention will now be explained in more detail with reference to the drawings, which schematically show-embodiments of the invention.

BRIEF DESCRIPTION OF THE ILLUSTRATIVE EMBODIMENTS

Figure 1:
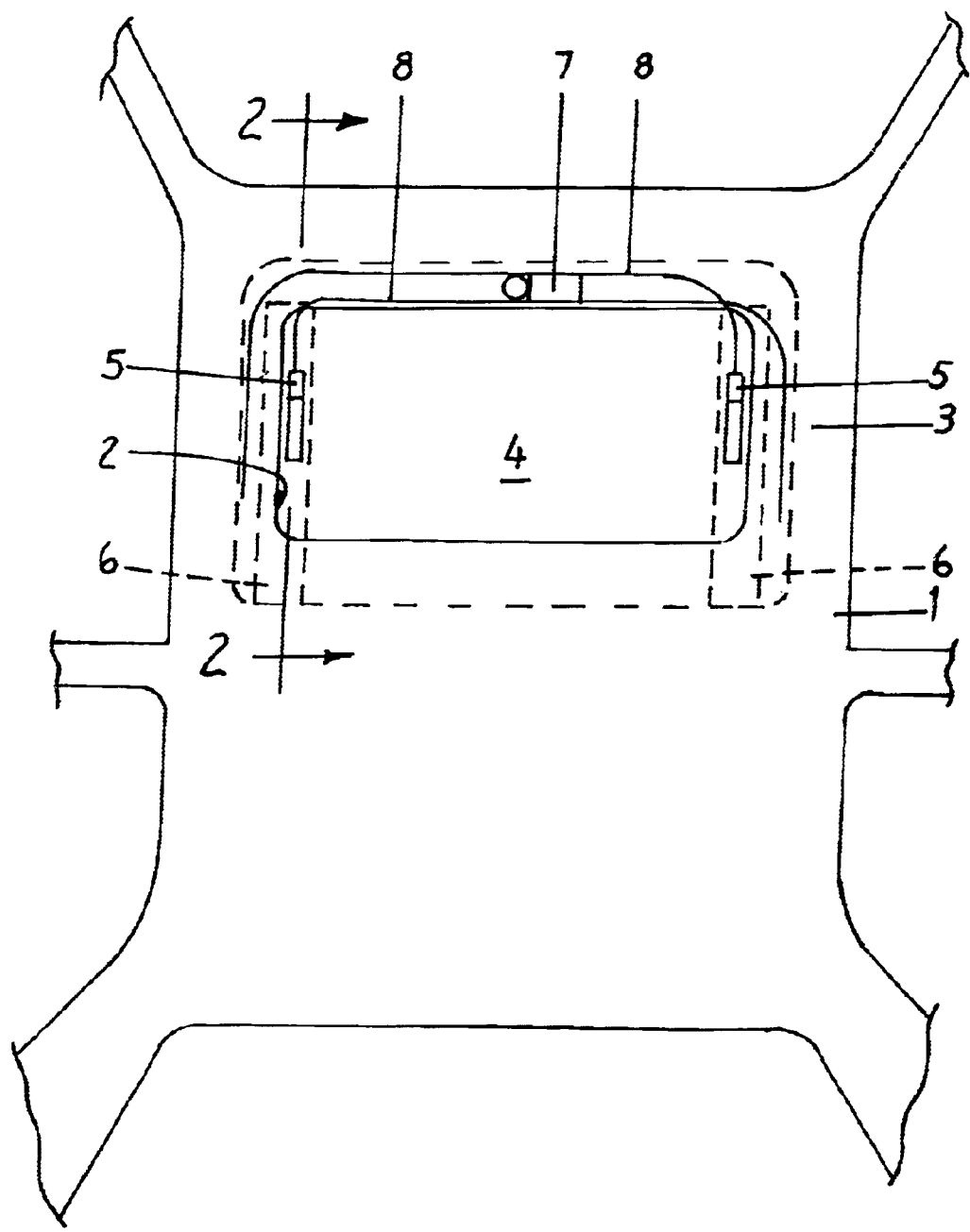
FIG. 1 is a schematic top plan view of a vehicle roof fitted with an open roof construction according to the invention.

The drawing, and in the first instance FIG. 1 thereof, shows the fixed roof 1 of a motor vehicle, such as a passenger car, wherein an opening 2 is formed in fixed roof 1 for accommodating an open roof construction or assembly. The open roof construction comprises a frame 3 or the like stationary device to be fixed to the vehicle for movably supporting a closure element 4.

In the illustrated embodiment, the open roof construction is in the form of a so-called spoiler roof, which is provided (in this embodiment) with a more or less rigid and preferably transparent panel 4 as the closure element, which is capable of selectively closing the roof opening 2 or releasing it to a greater or lesser extent. To this end, panel 4 is laterally supported by operating mechanisms 5, which are slidably accommodated in guide rails 6, which are for example mounted on frame 3 or frame part thereof, and which extend in a parallel relation in a longitudinal direction on at least one side of the roof opening 2, and slightly forward and rearward thereof. Said operating mechanisms 5 can be moved synchronously in guide rails 6, thus moving the panel not only in the longitudinal direction, but also in vertical direction. To this end the operating mechanisms 5 are operated from a drive unit 7, such as an electric motor or a crank, for example via push-pull cables 8.

FIGS. 2–6 show the operating mechanism 5 on one of the long sides of panel 4 in more detail. As can be seen in the figures, panel 4 is supported by a supporting part 9, which in this case consists of a narrow, elongated single or compound metal and/or plastic section, which is mounted on a long side of a panel 4. The supporting part 9 is pivotally supported at its front end, in this case by a pivot pin 10 that is more or less fixedly connected to guide rail 6.

In the illustrated embodiment, supporting part 9 is also configured as a curved plate provided with a curved guide slot 11, in which a guide pin 12 engages, which guide pin 12 is movable therein for adjusting the supporting part 9 of panel 4 in a vertical direction. Guide pin 12 is mounted on a first slide 13 which is slidably accommodated in guide rail 6, and which is connected, for example via a rod (not shown), to a coupler 14 capable of coupling and uncoupling first slide 13 to and from a pull-push cable 8 fitted with mating a coupler 15. Guide rail 6 is fitted with an operating element for couplers 14, 15, for example in the form of a control slot 16.

Guide slot 11 in supporting part 9 of panel 4 includes a first slot portion 11' and a second slot portion 11" rearwardly adjacent thereto, wherein first slot portion 11' slopes up in a rearward direction, seen in the closed position of the panel 4, while the second slot portion 11", on the other hand, slopes down. Guide pin 12 is present at the transition between the two slot portions 11' and 11" in the closed position of panel 4. Slot portion 11' is considerably longer than slot portion 11". The slope of slot portion 11' is furthermore less steep than that of second slot portion 11", while the two slot portions 11' and 11" bridge at least substantially the same height.

Mounted between supporting part 9 and panel 4 is a guide 17, which enables the panel 4 to move relative to supporting part 9 in the longitudinal direction thereof. This makes it possible to move panel 4 rearwards from its frontmost position to a position above fixed roof 1 so as to release the roof opening 2 and the front side of panel 4. Said guide 17 may comprise a telescopic intermediate part, as is for example used with (desk) drawers, which makes it possible to move the panel 4 a greater distance in rearward direction with respect to supporting part 9, while the engagement between the various parts of the guide is maintained over a relatively great distance, so that panel 4 is stably supported and undesirable movements of panel 4 can be prevented, also at higher vehicle speeds.

The movement of panel 4 with respect to supporting part 9 is carried out by means of a second slide 18, which is capable of moving panel 4 via a pressure-rigid rod 19 which is pivotally connected to said panel and to slide 18, and of offsetting the difference in height between panel 4 and slide 18 during the movement of the panel 4. The second slide 18 is also fitted with a coupler 20 for co-operation with coupler 15 of cable 8. Also in this case the coupling and uncoupling of couplers 15 and 20 takes place via.a control element of the guide rail 6, such as a control slot 21.

The operation of the open roof construction according to the embodiment as shown in the drawings is as follows.

Figure 3:
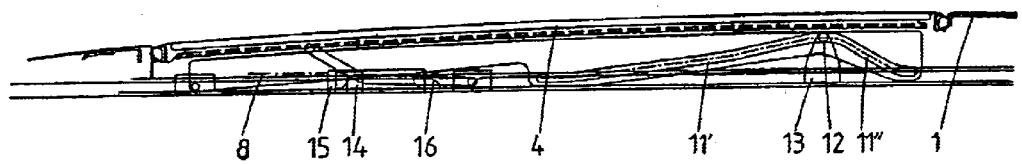

FIG. 3 shows the panel in its closed position, in which the panel is entirely positioned within roof opening 2, in which position in closes said opening by means of seals. Guide pin 12 of first slide 13 is present at the transition between first slot potion 11' and second slot portion 11" of guide slot 11 which forms the highest part of guide slot 11, so that panel 4 occupies its lowermost position. Coupler 14 of first slide 13 is connected to cable 8 via coupler 15.

Figure 2:
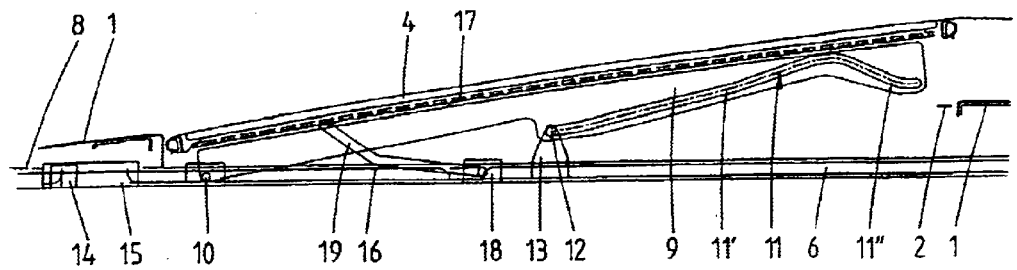
FIGS. 2–6 are larger-scale schematic longitudinal sectional views of the open roof construction of FIG. 1 according to line II—II in FIG. 1, showing the open roof construction in five different positions thereof.

In FIG. 2, the first slide 13 is shown to have been moved to the front end of first slot portion 11' of guide slot 11 by means of cable 8, and the movement of guide pin 12 through guide slot 11 has caused panel 4 to pivot upwards, on the one hand as a result of the wedging action and on the other hand as a result of the downward slope of first slot portion 11'. Since guide pin 12 is positioned far towards the rear in the closed position of panel 4, guide pin 12 of first slide 13 can be moved to its frontmost position corresponding to the high ventilating position of panel 4 with a relatively large movement of cable 8, while the distance to pivot pin 10 will remain sufficient for ensuring a stable support of panel 4. Since first slide 13 is directly connected to supporting part 9 of panel 4, a stable support is provided without using a lever.

From this position, slide 13 can be returned to the starting position which is shown in FIG. 3.

Figure 4:
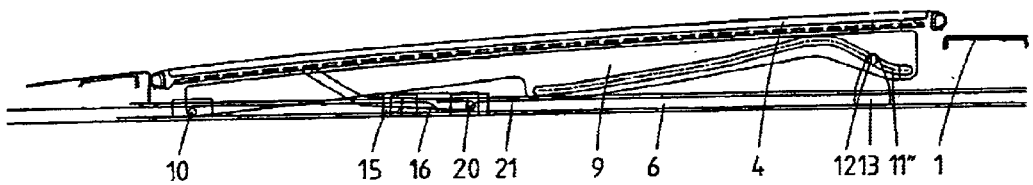

In FIG. 4 cable 8 has been moved so far that guide pin 12 has moved some distance through the second slot portion 11" of guide slot 11, and the panel now extends above the fixed roof 1 on its rear side. Coupler 15 of cable 8 has arrived at coupler 20 of the second slide 18 and the associated guide slot 21 of stationary guide rail 6, as a result of which coupling means 15 and 20 will effect a connection between themselves.

Figure 5:
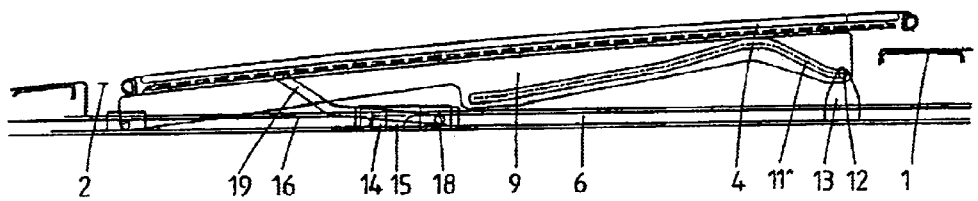

In FIG. 5, guide pin 12 has arrived at the rear end of second slot portion 11" of guide slot 11, and coupler 14 of first slide 13 has been uncoupled from coupler 15 of cable 8 by control slot 16 of guide rail 6, and first slide 13 will remain stationary upon further rearward movement of cable 8. Panel 4 has already been moved a small distance rearwards with respect to supporting part 9 as a result of the connection between cable 8 and second slide 18, and panel 4 will move rearwards to a position just above fixed roof 1.

Figure 6:
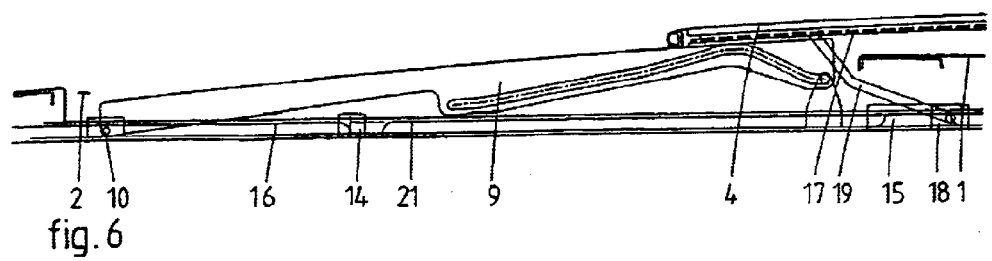

FIG. 6 shows the rearmost position of panel 4, wherein panel 4 has been moved maximally rearwards with respect to supporting part 9, so that approximately 70–80% of the roof opening 2 is released. Nevertheless, panel 4 is stably supported in that first slide 13 fitted with guide pin 12 is positioned practically at the rear edge of roof opening 2, and consequently panel 4 is supported as far to the rear as possible. Guide 17 between supporting part 9 and panel 4 is capable of firmly supporting said panel 4 and, if a telescopic intermediate part is provided, engagement is possible over a greater distance.

Panel 4 is returned to the closed position in a reverse manner.

Figure 7:
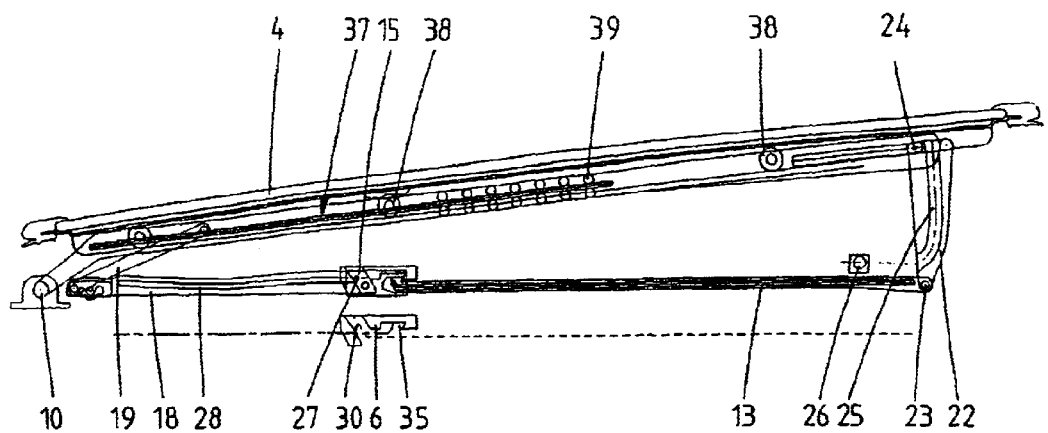
FIG. 7 is a schematic longitudinal sectional view of a second embodiment of the open roof construction according to the invention.
Figure 8:
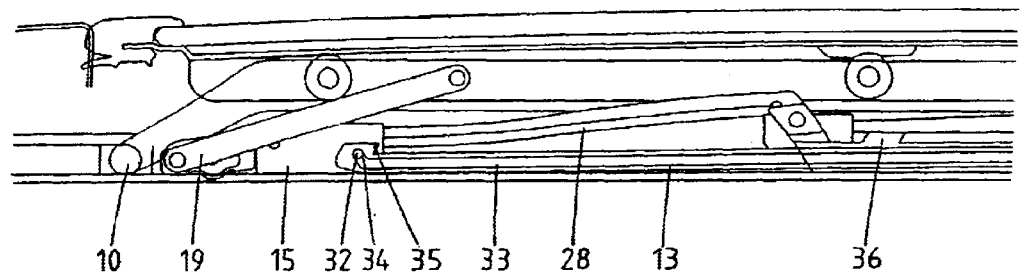
FIGS. 8–12 are larger-scale partial longitudinal sectional views of the schematic exemplary embodiment of FIG. 7, showing said embodiment in five different positions thereof.
Figure 9:
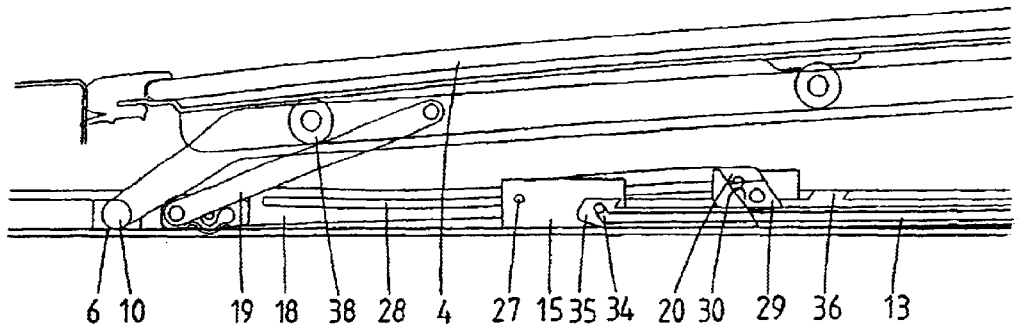
Figure 11:
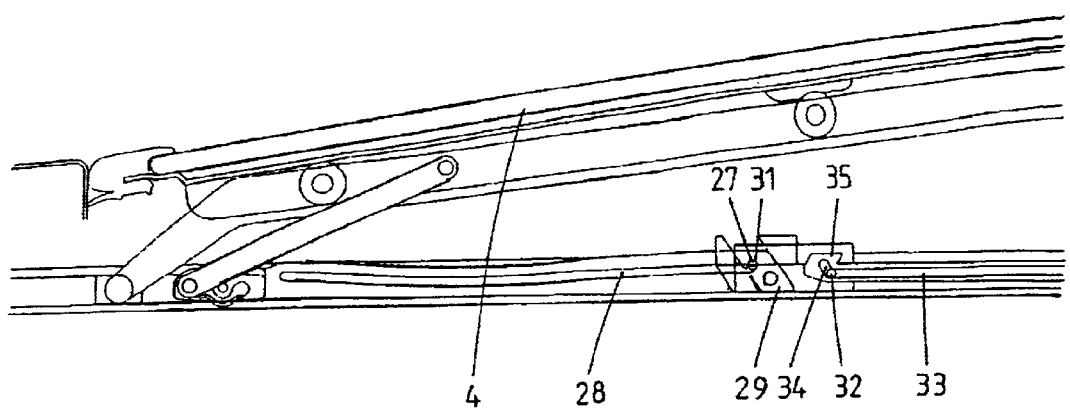
Figure 10:
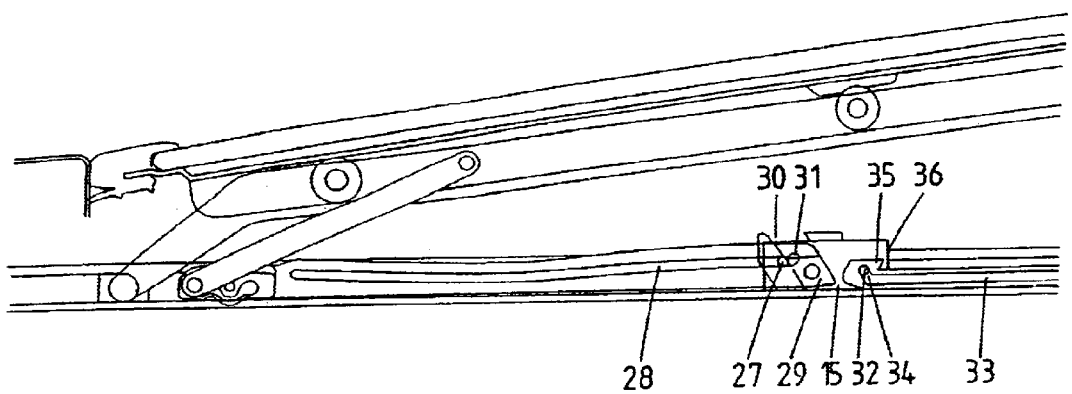
Figure 12:
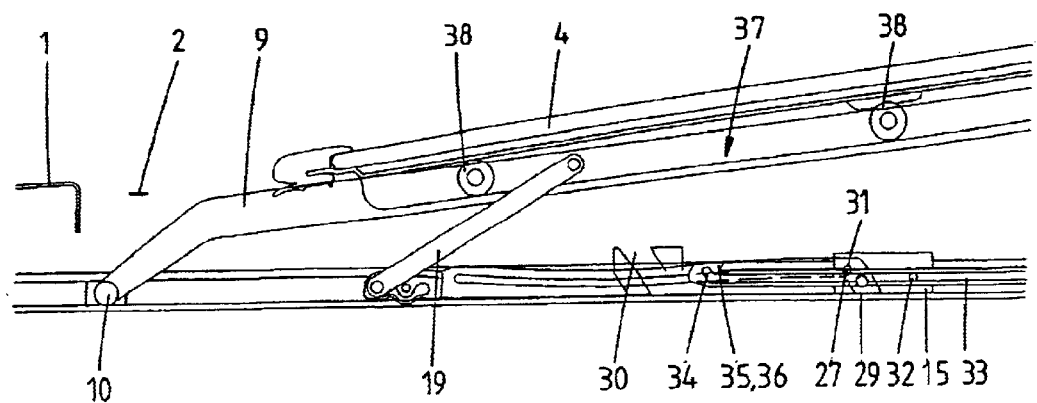

FIG. 7 schematically shows the second embodiment of the open roof construction according to the invention, wherein the operating mechanism 5 for panel 4 is provided with a lifting lever 22, which effects the pivoting movements of panel 4. Said lifting lever 22 may be constructed in various ways, but in this case the lifting lever is connected to first slide 13 via a lower pivot 23 and to supporting part 9 of panel 4 via an upper pivot 24, while a guide slot 25 of lifting lever 22 is capable of co-operation with a stationary guide pin 26. Various other constructions are possible.

FIGS. 8–12 are more detailed views of the embodiment of FIG. 7, wherein the operation is illustrated by showing various positions thereof.

As can be seen in FIGS. 7 and 8–12, coupler 15 of cable 8 is provided with a pin 27, which is in engagement with a slot 28 which forms part of coupler 20 of second slide 18. Said slot 28 is slightly curved for the purpose of adjusting coupler 20 in a vertical direction, in such a manner that a cam 29 of coupler 20 can be moved into and out of engagement with a locking slot 30 of stationary guide rails 6. A locking recess 31 is formed at the rear end of slot 28, in which pin 27 is retained while second slide 18 is locked in the vertical direction by stationary guide 6 in that case, for example the cam 29 which abuts against a flange of guide rails 6 on the upper side.

Coupler 15 of pull-push cable 8 possesses a second pin 32, which is in engagement with a slot 33 which forms the coupler 14 of first slide 13. Said slot 33 comprises a sloping front locking portion 34, in which pin 32 will remain locked as long as first slide 13 is being driven by pull-push cable 8. At the end of the rearward adjustment range of slide 13, which is for example defined by a stop (not shown), an upwardly projecting cam 35 formed on first slide 13 at the location of locking portion 34 can move upwards into a locking recess 36 formed in the horizontal flange of guide rails 6 when the second pin 32 of coupler 15 moves through the locking portion 34 of slot 33 to the horizontal main portion thereof. The first slide 13 will be locked in position with respect to the stationary guide rails 6 in that case upon further movements of coupler 15.

FIGS. 7 and 8–12 furthermore show the connecting rod 19, which is connected to panel 4, while FIG. 7 also shows a guide 37 in the form of a roller guide comprising rollers 39, which guides the movement between panel 4 and supporting part 9 in an advantageous manner. Numeral 38 indicates points of attachment for panel 4.

The operation of this second embodiment is comparable with that of the first embodiment and can be further derived from examining FIGS. 8–12 and the above description of the various parts.

Both embodiments have in common that the supporting part 9 of the panel 4 is only pivotable and not slidable. The advantage thereof is that the supporting part 9 may be made long relative to the panel 4 and may be supported at its extreme ends in the open position of the panel 4. This creates a very stable platform for the panel 4 and enables a long stroke of the panel 4 relative to the supporting part 9. This allows the roof opening to be released to a great extent. On the other hand, the stationary supporting part 9 makes the structure of the operating mechanism 5 more simple.

From the foregoing it will be apparent that the invention provides an open roof construction which is remarkable for a high opening percentage of the roof opening, a stable support of the panel 4, optimum pivoting positions in the ventilating position and the open position and low motor loads.

The invention is not restricted to the above-described embodiment as shown in the drawing, which can be varied in several ways without departing from the scope of the invention. Thus, it would also be possible to use only one slide, which alternately effects a lifting movement and a sliding movement of the panel 4 by connecting to different mechanisms. When more than one slide is used, said slides will usually be guided in different grooves in the guide rails 6, in such a manner that they can be coupled to the cable 8 or to other driving means. Also other solutions are possible, of course.

What is claimed is:

1. An open roof construction for a vehicle having an opening in a fixed roof, comprising a stationary part to be fixed to the roof, which stationary part includes a guide rail present on at least one side of the roof opening, at least one adjustable panel supported by said stationary part, which is adjustable between a closed position, in which it closes the roof opening, and an open position, in which it has been moved to a position above the fixed roof, as well as an operating mechanism arranged between the panel and the guide rail, said operating mechanism including a supporting part, which supports said panel, and a first slide which is capable of sliding movement along said guide rail, and a second slide, which is capable of slidably moving the panel with respect to said supporting part by a connecting part, wherein said first slide can move forwards as well as rearwards from a position corresponding to the closed position of the panel so as to pivot the panel upwards, while the panel can also be moved in a rearward direction in one of said two directions of the first slide, and wherein the operating mechanism is so arranged that when said first slide is moved so as to cause said panel to move in the rearward direction, said panel is pivoted upward less high than when said first slide is moved in the opposite direction.

2. The open roof construction according to claim 1, wherein the panel is pivoted to a high ventilating position upon forward movement of said first slide from the closed position, while the panel can move in the rearward direction in case of rearward movement of said first slide from said closed position.

3. The open roof construction according to claim 1, wherein said connecting part is in the form of a pivotable pull-push rod.

4. An open roof construction for a vehicle having an opening in a fixed roof, comprising a stationary part to be fixed to the roof, which stationary part includes a guide rail present on at least one side of the roof opening, at least one adjustable panel supported by said stationary part, which is adjustable between a closed position, in which it closes the roof opening, and an open position, in which it has been moved to a position above the fixed roof, as well as an operating mechanism arranged between the panel and the guide rail, said operating mechanism including a supporting part, which supports said panel, and a first slide which is capable of sliding movement along said guide rail, and a second slide, which is capable of slidably moving the panel with respect to said supporting part by a connecting part, and further comprising a pull-push cable guided in said guide rail, and wherein said first and second slides are provided with cooperating couplers to selectively couple and uncouple the push-pull cable to and from said first and said second slides, and wherein said guide rail is provided with control elements for said couplers.

5. The open roof construction according claim 4, wherein said first slide includes a pin, while said supporting part is provided with a guide slot for said pin, which does not extend in a straight line.

6. The open roof construction according to claim 5, wherein an adjustment range of said first slide from a position corresponding to the closed position of the panel in a forward direction is considerably larger than in a rearward direction.

7. The open roof construction according to claim 5, wherein the guide slot in said supporting part first extends upwards in a rearward direction, seen in the closed position of the panel, and then downwards again from a portion which is intended for the pin in the closed position of the panel.

8. The open roof construction according claim 1, wherein the supporting part has a front end, and wherein the panel, and the supporting part thereof, is pivotally supported on a fixed pivot near the front end of the supporting part.

9. An open roof construction for a vehicle having an opening in a fixed roof, comprising a stationary part to be fixed to the roof, which stationary part includes a guide rail present on at least one side of the roof opening, at least one adjustable panel supported by said stationary part, which is adjustable between a closed position, in which it closes the roof opening, and an open position, in which it has been moved to a position above the fixed roof, as well as an operating mechanism arranged between the panel and the guide rail, said operating mechanism including a supporting part, which supports said panel, and a first slide which is capable of sliding movement along said guide rail, and a second slide, which is capable of slidably moving the panel with respect to said supporting part by a connecting part, wherein a guide, comprising a telescopic intermediate part, is mounted between said panel and said supporting part.

10. The open roof construction according to claim 9, wherein said guide is a roller guide.

11. The open roof construction according to claim 9, wherein said first slide is operably connected to a lifting lever for the purpose of pivoting said panel.

12. An open roof construction for a vehicle having an opening in a fixed roof, comprising a stationary part to be fixed to the roof, which stationary part includes a guide rail present on at least one side of the roof opening, at least one adjustable panel supported by said stationary part, which is adjustable between a closed position, in which it closes the roof opening, and an open position, in which it has been moved to a position above the fixed roof, as well as an operating mechanism arranged between the panel and the guide rail, said operating mechanism including a supporting part, which supports said panel, and a first slide which is capable of sliding movement along said guide rail, wherein the supporting part of said operating mechanism and said panel are capable of sliding movement with respect to each other via a guide, wherein said guide is a roller guide.

13. An open roof construction for a vehicle having an opening in a fixed roof, comprising a stationary part to be fixed to the roof, which stationary part includes a guide rail present on at least one side of the roof opening, at least one adjustable panel supported by said stationary part, which is adjustable between a closed position, in which it closes the roof opening, and an open position, in which it has been moved to a position above the fixed roof, as well as an operating mechanism arranged between the panel and the guide rail, said operating mechanism including a supporting part, which supports said panel, and a first slide which is capable of sliding movement along said guide rail, wherein said first slide can move forwards as well as rearwards from a position corresponding to the closed position of the panel so as to pivot the panel upwards, while the panel can also be moved in a rearward direction in one of said two directions of said first slide, wherein the supporting part of said operating mechanism slidably supports said panel, and in that a second slide is provided, which is capable of moving the panel with respect to said supporting part by a connecting part.

14. The open roof construction according to claim 13, and further comprising a pull-push cable guided in the guide rail, and wherein said first and said second slides are provided with cooperating couplers for selectively coupling and uncoupling the push-pull cable to and from said first and said second slides, and wherein said guide rail is provided with control elements for said couplers.

15. The open roof construction according to claim 13, wherein said first slide can move forwards as well as rearwards from the position corresponding to the closed position of the panel so as to pivot the panel upwards, while the panel can also be moved in a rearward direction in one of said two directions.

* * * * *